March 17, 1964  D. B. FEGLES  3,124,906
STORAGE BIN ARRANGEMENT FOR GRAIN ELEVATORS AND THE LIKE
Filed Dec. 20, 1960  2 Sheets-Sheet 1
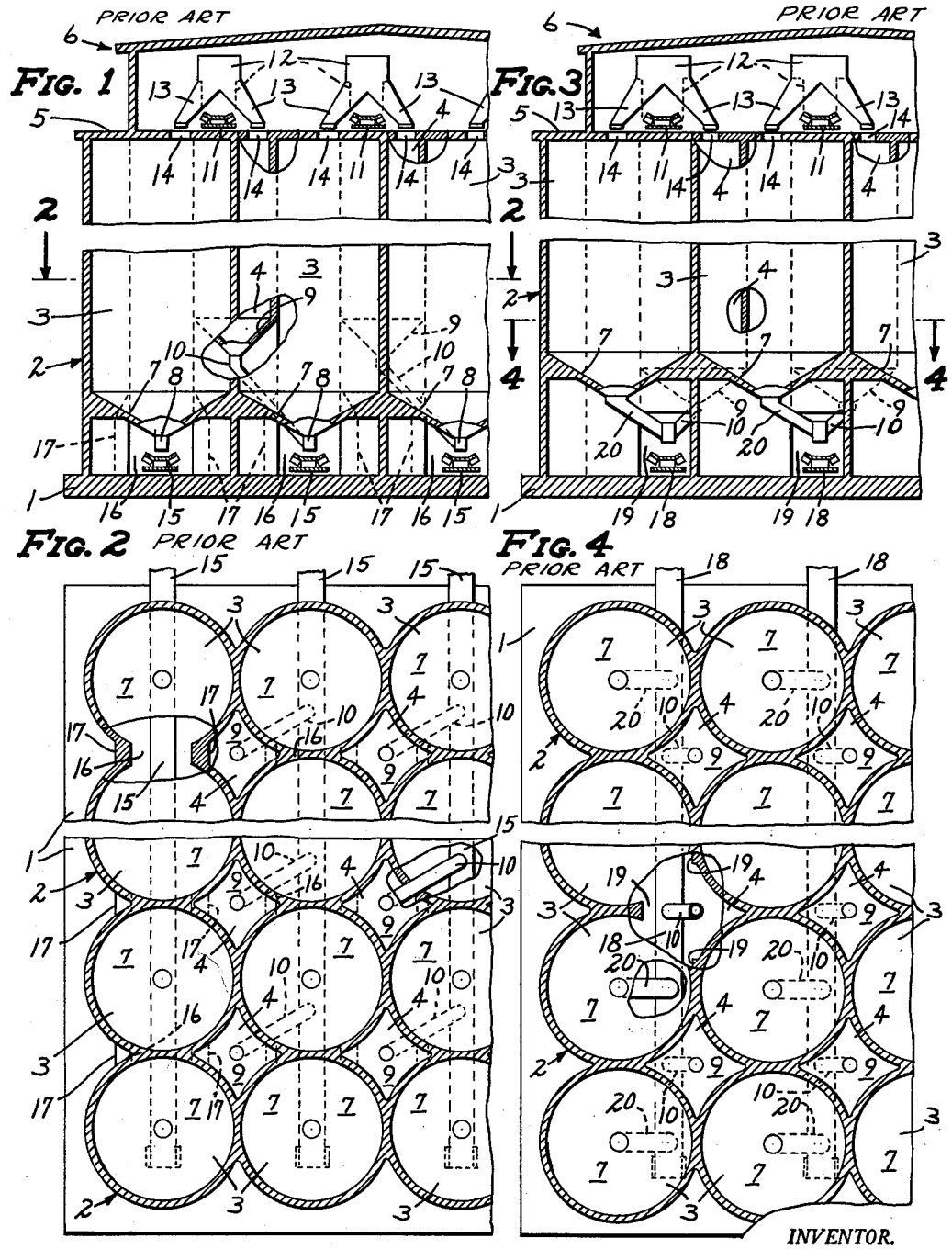
INVENTOR.
DONALD B. FEGLES
BY
Merchant & Merchant
ATTORNEYS March 17, 1964  D. B. FEGLES  3,124,906
STORAGE BIN ARRANGEMENT FOR GRAIN ELEVATORS AND THE LIKE
Filed Dec. 20, 1960  2 Sheets-Sheet 2
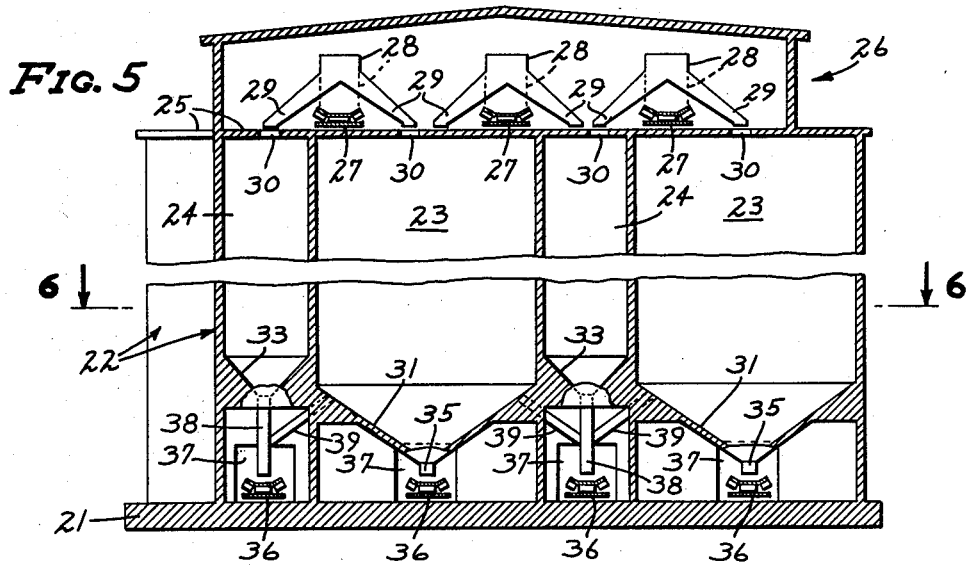
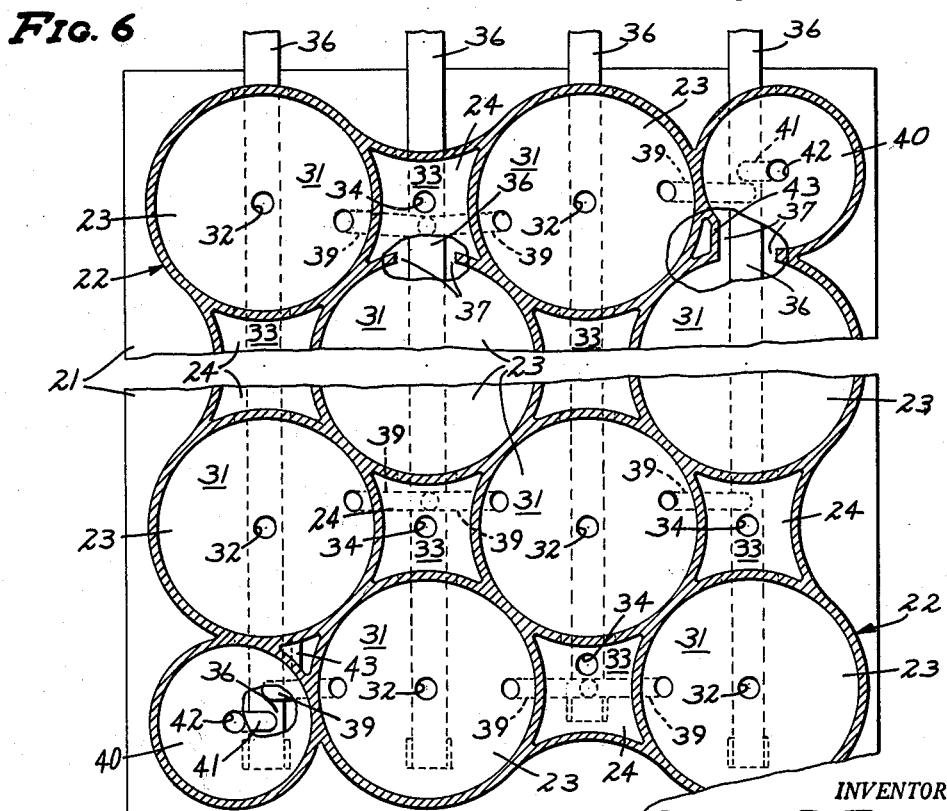
INVENTOR.
DONALD B. FEGLES
BY
Merchant & Merchant
ATTORNEYS United States Patent Office 3,124,906
Patented Mar. 17, 1964

3,124,906
STORAGE BIN ARRANGEMENT FOR GRAIN ELEVATORS AND THE LIKE
Donald B. Fegles, Minneapolis, Minn., assignor to Fegles Construction Company, Inc., Minneapolis, Minn., a Minnesota corporation
Filed Dec. 20, 1960, Ser. No. 77,071
3 Claims. (Cl. 50—113)

My invention relates generally to storage unit construction for the storage of granular material, such as grain or the like, and more particularly to a novel arrangement of axially vertically disposed generally cylindrical storage bins of the type generally used in terminal grain elevators and the like.

Heretofore, such storage units have comprised a plurality of rows of upright cylindrical primary tanks or bins, preferably made from concrete or the like, the rows of bins extending longitudinally and transversely of the unit, the bins of each row being conjoined with adjacent bins in their respective rows both longitudinally and transversely of the unit. In other words, the bin wall contacts, or areas of joinder between adjacent bin walls, occur on horizontal center lines of the bins, these center lines extending parallel to and normal to the longitudinal axis of the unit. In storage unit construction of the type above set forth, material is stored, not only in the primary cylindrical bins, but also in the interstices between the adjacent rows of bins. The bin wall structure is supported by a suitable foundation, the bins having hopper-like bottoms disposed in overlying spaced relation to the foundation. Material to be stored is introduced to the interior of the cylindrical primary bins and to the interstice bins through suitable openings at the tops thereof, the material being discharged from the bins by gravity through closable openings in the bottoms of the bins, and directed to reclaiming conveyors underlying the bin bottoms and supported on the foundation, said conveyors carrying the material from the bins to a point of disposal. These conveyors, which are usually of the endless flexible belt variety, extend either longitudinally or transversely of the unit, as desired, each conveyor passing beneath all of the primary bins of a respective row of bins, whereby the material from a plurality of bins may be commingled on the conveyor and a desired mixture of material conveyed to the point of delivery. Suitable discharge conduits extend from the bottoms of the interstice bins to adjacent ones of said conveyors, so that material from the interstice bins may also be discharged therefrom and commingled with the material from the primary bins.

In order that the reclaiming conveyors may extend along a full row of bins, it is necessary to provide openings therefor in the bin wall structure below the bottoms of the bins. In the arrangement of bins above described, each of the reclaiming conveyors is disposed to intersect the axis of each bin in a respective row thereof, these openings for the conveyors occurring at the bin wall contacts, and being substantially as wide as the contact area of adjacent bins. In order that the bin wall bearing strength is not sacrificed at these areas, where it is much needed, additional wall thickness adjacent the openings, or greater contact area between the bins, is required, thus utilizing an undue quantity of building material such as steel or concrete. This arrangement does permit the bottoms of the primary bins to be disposed at a low level above the conveyors. However, the bottoms of the interstice bins must be raised sufficiently to permit material to flow by gravity therefrom to a rather remote conveyor, and an appreciable amount of space below each interstice bin, which might otherwise be utilized for storage, is wasted.

Another arrangement, heretofore utilized, disposes the reclaiming conveyors in laterally offset relation to the axes of the primary bins, whereby the conveyor openings in the bin walls are disposed at one side of the contact areas between adjoining bins. This arrangement permits lowering of the bottoms of the interstice bins, but necessitates raising of the bottoms of the primary bins, so that the material therein might properly flow by gravity to the reclaiming conveyors. Further, the conveyor openings in the bin walls, by extending obliquely therethrough instead of radially as in the arrangement first described, are of sufficient circumferential extent so as to necessitate a substantial reinforcing of the bin wall structure adjacent the openings for proper support of the structure.

The primary object of my invention is the provision of a storage unit of the general character above described, comprising a plurality of rows of bins extending in directions parallel to the longitudinal and transverse axes of the unit, said rows each having primary bins separated by interstice bins.

Another important object of my invention is the provision of a storage unit as set forth, in which the primary bins of each row of bins are staggered with respect to the primary bins of adjacent rows, the primary bins of each row being disposed in conjoining relationship to adjacent primary bins of an adjacent row and at points angularly displaced from horizontal center lines parallel to the longitudinal axis of the unit and intersecting the axes of the primary bins of respective rows of bins.

Another object of my invention is the provision of a storage unit as set forth, in which the longitudinally extending horizontal center line of each row of bins intersects the axis of the interstice bins of the same row.

Still another object of my invention is the provision of a storage unit in which the bin wall structure below the bottoms of the storage bins in each row thereof defines aligned openings angularly displaced from the bin wall contact portions between adjacent bins for reception of reclaiming conveyor means underlying the discharge openings in the bottoms of the storage bins.

Another object of my invention is the provision of a storage unit wherein maximum storage capacity is obtained with a minimum of waste space.

The above, and still further highly important objects and advantages of my invention, will become apparent from the following detailed specification, appended claims and attached drawings.

Referring to the drawings, in which like reference characters indicate like parts throughout the several views:

FIG. 1 is a fragmentary diagrammatic view in transverse section of one form of storage unit as presently used;

FIG. 2 is a fragmentary horizontal section taken on the line 2—2 of FIG. 1;

FIG. 3 is a view corresponding to FIG. 1 but showing an alternative arrangement;

FIG. 4 is a horizontal section taken substantially on the line 4—4 of FIG. 3;

FIG. 5 is a fragmentary view corresponding to FIGS. 1 and 3, but showing the bin arrangement according to my invention; and FIG. 6 is a fragmentary horizontal section taken substantially on the line 6—6 of FIG. 5.

Present day storage bins for grain or the like, commonly used in terminal grain elevators, are usually monolithic structures of poured concrete. These bins are generally cylindrical in form, and are arranged in a plurality of rows, as shown in FIGS. 1–4. The bottoms of the bins are of downwardly tapering hopper-like form, having closable openings at their central portions, the bottoms usually being made from steel or concrete.

Further, the spaces between adjacent rows of bins are utilized to store material, these spaces being usually termed interstice bins. Like the main or primary bins, the interstice bins are provided with hopper-like concrete bottoms having closable discharge apertures at their central portions. The two arrangements of storage bins shown in FIGS. 1–4, in present day use, are included in this disclosure to more clearly illustrate the distinction therebetween and the arrangement of my invention, illustrated in FIGS. 5 and 6.

With reference to the arrangement diagrammatically illustrated in FIGS. 1 and 2, a conventional storage unit is shown as comprising, a foundation 1, bin wall structure 2 defining a plurality of longitudinally extending rows and transversely extending rows of cylindrical primary bins 3 and interstice bins 4, bin top or cover structure 5 closing the upper ends of the bins 3 and 4, and a cupola structure 6 overlying the bin top structure 5. The primary bins 3 are provided with downwardly tapering hopper-like bottoms 7 having conventional closable discharge apertures at their central portions from which extend downwardly directed discharge conduits or the like 8. Likewise, the interstice bins 4 have hopper-like bottoms 9 also provided with conventional closable discharge apertures at their central portions from which extend discharge conduits or the like 10.

The cupola structure 6 encloses the usual mechanism for delivering granular material to the several bins 3 and 4, this mechanism being shown diagrammatically as involving belt conveyors 11 and trippers 12 which receive material from the conveyors 11 and deliver the material to the bins 3 and 4 by means of distributor legs 13 and openings 14 in the bin top structure 5. Material to be stored in the bins 3 and 4 is delivered to the distributing conveyors 11 by the usual elevator mechanism, not shown.

Material from the bins 3 and 4 is discharged through the conduits 8 and 10 to endless conveyor belts 15 which underlie the central portions of the primary bins 3 and extend longitudinally of each longitudinal row thereof to a desired point of delivery, not shown. The conveyor belts 15 extend through openings 16 in the bin wall structure 2 between the foundation 1 and the bin bottoms 7.

The arrangement illustrated in FIGS. 1 and 2 wherein the conveyors 15, commonly known as reclaiming conveyors, underlie the central discharge portions of the bottoms 7 of the primary bins 3, permits the distance between the foundation 1 and the bin bottoms 7 to be held at a minimum, thereby providing a maximum height and storage capacity in the primary bins 3. However, due to the extreme lateral distance between the centers of the interstice bin bottoms 9 and the reclaiming conveyors 15, the bin bottoms 9 must be raised to a considerable extent to permit the discharge conduits 10 to be disposed at a proper angle for gravity discharge from the interstice bins 4 to an adjacent one of the reclaiming conveyors 15. Thus, an appreciable space below each interstice bin 4, which might otherwise be used for storage, is wasted. Further, it will be seen that the openings 16 in the bin wall structure 2 extend through the areas of joinder, or contact areas, between adjacent bins 3 of each longitudinally extended row thereof the openings 16 must be of a size to accommodate the reclaiming conveyors 15, as well as to permit an operator to pass easily therethrough, and, in thus extending the openings 16 through the area of contact between adjacent bins, the bearing value of that portion of the bin wall 2 is lost. Hence, a sufficient quantity of wall material must be included adjacent the openings 16 to overcome the weakness imposed by the openings 16. The additional material, is shown in FIG. 2 and indicated at 17. As an alternative to extending the contact area adjacent the openings 16, as at 17, the thickness of the bin wall structure 3, adjacent the openings 16 may be increased to overcome the weakness therein. However, either method for strengthing the bin wall structure involves the use of a substantial additional amount of building material, such as concrete, if the wall were thickened throughout its height, or a considerable increase in concrete forming costs, as well as if the wall is thickened for a limited vertical distance.

In the arrangement illustrated in FIGS. 3 and 4, the bins are arranged in the same manner as those of FIGS. 1 and 2, the foundation, bin wall structure, bin top and cupola structures carrying the same reference numerals as their corresponding elements of FIGS. 1 and 2, as does the distributing means contained within the cupola structure. In the arrangement of FIGS. 3 and 4, the reclaiming belts are disposed in laterally offset parallel relationship to horizontal central lines intersecting the axes of the primary bins 3 of each longitudinal row thereof, the reclaiming conveyors indicated at 18, extending through aligned openings 19 in the bin wall structure 2 below the bottoms 7 of the primary bins 3. With this arrangement, it will be seen that the openings 19 extend through but a small portion of the contact area between adjacent primary bins 3 of each row thereof, and that little if any reinforcing must be done at these points. However, any advantage thus gained is offset by the fact that the openings 19 must be of a substantially greater dimension circumferentially of the bin walls than that of the openings 16, in view of the fact that the reclaiming conveyors 18 extend obliquely through the openings 19 in the bin wall structure 2, thus providing a substantially weakened area in the bin wall structure. Further, although the reclaiming conveyors 18 are disposed in more closely spaced relationship to the vertical axes of the interstice bins 4 of FIGS. 3 and 4 than are the conveyors 15 of FIGS. 1 and 2, permitting the bottoms of the interstice bins 4 of FIGS. 3 and 4 to be substantially lower than those of FIGS. 1 and 2, the offset relationship of the conveyors 18 to the axes of their respective primary bins 3 necessitates raising of the bin bottoms 7 to permit free gravity flow of material from the primary bins 3 to the conveyors 18. As shown in FIG. 3, relatively long sloping discharge conduits 20 are required to convey material from the primary bins 3 to the reclaiming conveyors 18. Thus, it will be seen that, while the bottoms of the interstice bins 4 of FIGS. 3 and 4 may be lowered to some extent, raising of the bottoms 7 of the primary bins 3 results in a net loss of storage capacity over that of the arrangement illustrated in FIGS. 1 and 2.

In the bin arrangement of my invention, illustrated in FIGS. 5 and 6, the integral planar base 21 and upwardly extending continuing foundation wall portions of the upper bin wall structure 22 which defines a plurality of rows of vertically disposed generally cylindrical primary bins 23 and interstice bins 24, said rows extending longitudinally and transversely of the storage unit. The primary bins 23 of each row thereof are disposed in staggered relationship to the primary bins 23 of adjacent rows, the primary bins 23 of each row being disposed in conjoining relationship to the primary bins 23 of an adjacent row, see FIG. 6. With this arrangement, each row of bins comprises alternate primary and interstice bins, and a horizontal center line parallel to the longitudinal axis of the unit will intersect the axes of all of the primary and interstice bins of a given longitudinal row of bins. A bin top structure 25 overlies the upper end of the bin wall structure 22 and closes the tops of the primary and interstice bins 23 and 24 respectively, and a cupola structure 26 rests on the bin top structure 25, and houses conventional material distributing mechanism including belt conveyors 27, trippers 28 and distribution legs 29 which deliver material to the various primary bins 23 and interstice bins 24, through openings 30 in the bin top structure 25.

The primary bins 23, like the bins 3, have hopper-like bottoms 31 that are disposed in upwardly spaced relation to the base 21 and provided with central closable discharge apertures 32, and the interstice bins 24 likewise have hopper-like bottoms 33 provided at their central portions with the usual closable discharge apertures 34. Means for closing the discharge apertures 32 and 34 are well known in the art, and do not in themselves constitute the instant invention. Hence, for the sake of brevity, showing and description of closure means for the discharge apertures is omitted. Short discharge conduits 35 extend downwardly from the discharge apertures 32 into closely spaced overlying relationship to conventional reclaiming conveyors 36 that extend longitudinally of the longitudinal rows of bins 23 and 24, each conveyor 36 extending through a plurality of aligned openings 37 in the bin wall structure 22. Each conveyor 36 is disposed beneath the discharge apertures 34 of the interstice bins 24 in its respective row of bins, generally vertically disposed conduits 38 extending downwardly from the interstice bins 24 toward the conveyors 36 in their respective rows of bins. If it is desired that material be drawn from primary bins 23 of one row of bins and discharged to the conveyor 36 of an adjacent row of bins, I provide discharge conduits 39, each of which communicates with a respective bin 23 of one row thereof and with a discharge conduit 38 of the adjacent row thereof, see FIG. 5. With this arrangement, and in order that material will be enabled to flow by gravity from a given primary bin 23 through its conduit 39, it is necessary that the bottom 33 of an adjacent interstice bin 24 be disposed above the level of the bottoms of the primary bins 23, as shown. However, if such extreme intermixing of the material between different rows of bins during the discharge of the material, is not required, the bottoms 33 of the interstice bins 24 may be disposed at a lower level than that shown in FIG. 5. With the arrangement shown in FIGS. 5 and 6, storage capacity of the unit is at least equal to that of either of the storage units of FIGS. 1–4, if not greater, in units of equal overall dimensions.

Another highly desirable advantage which the arrangement of FIGS. 5 and 6 enjoys over the present day structures, lies in the arrangement wherein the openings 37 for the conveyors 36 are angularly displaced from the contact areas between adjoining bins. With the arrangement of bins shown in FIGS. 5 and 6, this is true whether the conveyors are disposed beneath row of bins extending longitudinally of the unit, as shown, or whether the conveyors 36 were disposed normal to the positions shown and extending beneath transverse rows of bins, in which case the openings 37 would be angularly displaced 90 circular degrees from the positions thereof shown in the drawings. The arrangement illustrated in FIGS. 5 and 6, wherein the conveyors 36 intersect the axes of the several bins in their respective rows, the openings 37 in the bin wall structure 22 below each primary bin 23 extend radially through the walls, thus permitting the openings 37 of a given width cut from the circumference of the bin wall in bearing a minimum amount. Further, these openings being remote from the areas of bin wall contact between adjoining primary bins of adjacent rows, there is less necessity for addition of structural material, such as concrete to the bin wall structure adjacent the openings 37.

In view of the staggered relationship between the primary bins 23 of adjacent rows thereof, a pair of corners of the storage unit, which might otherwise leave waste space, are occupied by a portion of the bin wall structure 22 which defines a pair of upright cylindrical secondary bins 40 of somewhat smaller diameter than the primary bins 23. As shown in FIG. 6, the axes of the secondary bins 40 are laterally offset slightly from the underlying conveyors 36, and relatively short conduits 41 direct material from the discharge apertures 42 of the secondary bins 40 to the underlying conveyors 36. Further, although the reclaiming conveyor openings between the secondary bins 40 and their adjacent primary bins 23 extend through the contact area of the bin wall structure between these bins, additional bin wall material needs be added only at these two areas in the entire storage unit, as indicated at 43 in FIG. 6. It will be appreciated that inclusion of the auxiliary bins 40 is optional, and that different numbers of rows and differing numbers of primary bins in the rows thereof may or may not provide room at the corners of the unit for such auxiliary bins.

While I have not shown or described any means for driving the several conveyors, such as the distributing conveyors 11 and 27, and the reclaiming conveyors 15 and 36, it may be assumed that the same are driven by the usual driving means therefor, such means being well known to those skilled in the art. Further, while I have shown and described a commercial embodiment of my novel storage bin arrangement, whereby material is discharged therefrom in a highly efficient manner, and in which a maximum of storage space is obtained with a minimum of bin wall structure within a given area, it will be understood that the same is capable of modification without departure from the spirit and scope of the invention, as defined in the claims.

What I claim is:

1. A storage unit for granular material, said unit comprising a horizontal generally planar base structure and wall structure integral with and extending upwardly from said base and defining connected upright side walls of a plurality of parallel rows of vertical generally cylindrical primary storage bins, each of said rows of bins extending in a direction parallel to one of the horizontal longitudinal and transverse axes of said unit, said primary bins of each row being spaced apart longitudinally of the row thereof and each being disposed in staggered overlapping relationship with respect to and extending partially inbetween the primary bins of an adjacent row, portions of oppositely disposed inner walls of adjacent primary bins being connected by an integrally formed common wall to provide inner connected side walls of vertically extending interstice bins of materially less transverse areas than said primary bins, said primary and interstice bins each having bottoms disposed above the level of said base, said bottoms having closable discharge apertures substantially on the axes of their respective bins, corresponding opposed wall portions associated with each of said bins in each row thereof having openings therethrough below the level of said bottoms, said openings associated with each row being aligned with the other openings associated with the same row of bins and defining spaced portions of a passage for conveyor means, the passage associated with each row of bins having a longitudinal axis underlying the central portions of the alternately arranged primary and interstice bins in its respective row, and other bin discharging means carried by said bottoms of certain aligned primary bins and extending laterally with respect thereto to a discharge position upon a conveyor of an adjacent parallel row of bins.

2. A gravity storage unit for granular material, said unit comprising a horizontal generally planar base structure and vertical wall structure comprising like interconnected generally cylindrical foundation and upper continuing side walls of a plurality of parallel rows of adjacent alternately arranged and aligned vertical primary and interstice bins, the primary bins of each row being spaced apart longitudinally of the row thereof and each being disposed in staggered overlapping relationship with respect to and extending partially inbetween the primary bins of an adjacent row, portions of oppositely disposed inner walls of adjacent primary bins being connected by an integrally formed common wall to provide inner connected side walls of said vertically extending interstice bins of materially less transverse areas than said primary bins, a multiple hopper bottom wall structure disposed above the level of said base and connected to said vertical bin forming wall structure to provide below said hopper bottom wall structure parallel rows of alternately arranged and aligned primary and interstice bin chambers, bin discharging means carried by said hopper bottom wall structure and disposed in each of said alternately arranged and aligned chambers substantially in the vertical axis of said associated primary and interstice bins, opposed walls of each of said alternately arranged chambers having openings aligned in a direction parallel to the rows and intersecting the axis of each said bin for the passage therethrough of conveyor means immediately below said discharge means of each of said alternately arranged and aligned primary and interstice bins, and other bin discharging means carried by the hopper bottom wall structure of certain aligned primary bins and extending laterally with respect thereto to a discharge position upon a conveyor of an adjacent parallel row of bins.

3. A gravity storage unit for granular material, said unit comprising a generally planar base slab and wall structure integral therewith and extending perpendicular thereto defining the connected side walls of a plurality of parallel rows of base slab supported vertical generally cylindrical primary storage bins and transversely inset intermediate interstice bins in each row, said rows of bins extending in a direction parallel to one of the horizontal longitudinal and transverse axes of said unit, the primary bins of each row being spaced from like bins of the row and being disposed in staggered overlapping relationship with respect to and extending partially in-between the primary bins of an adjacent row, whereby said connected wall structure defines the side walls of vertically extending alternately arranged interstice bins in each said row, said vertical side-by-side wall structure of said primary and interstice bins each having between the upper and lower extremities thereof interconnecting angularly disposed connecting walls providing hopper bottoms for each of said bins in each row and above the level of said base slab, bin discharging means carried by said hopper bottoms centrally of said bins, said vertical side wall structure below said hopper bottoms in each row having aligned openings therethrough whereby conveyor means may be extended from end to end of each row centrally beneath said hopper bottoms of said primary and interstice bins, and other bin discharging means mounted in an angularly disposed side wall of certain aligned primary bin bottoms and extending laterally thereof to a point of discharge upon a conveyor of an adjacent parallel row of bins.

References Cited in the file of this patent

UNITED STATES PATENTS

| | | |
|---|---|---|
| 93,352 | Sampson | Aug. 3, 1869 |
| 662,452 | Macdonald | Nov. 27, 1900 |
| 699,439 | Ballou et al. | May 6, 1902 |
| 860,942 | Schwartz | July 23, 1907 |
| 873,774 | McQueen | Dec. 17, 1907 |
| 1,722,970 | Durham | July 30, 1929 |
| 1,913,174 | Stephenson | June 6, 1933 |